United States Patent
Kameya et al.

(10) Patent No.: US 7,081,311 B2
(45) Date of Patent: Jul. 25, 2006

(54) FUEL CELL SYSTEM

(75) Inventors: Hirotaka Kameya, Tsuchiura (JP);
Fumio Takeda, Ushiku (JP); Masayuki Kasahara, Shimizu (JP); Hitoshi Nishimura, Shimizu (JP)

(73) Assignee: Hitachi, Ltd., Tokyo (JP)

( * ) Notice: Subject to any disclaimer, the term of this patent is extended or adjusted under 35 U.S.C. 154(b) by 585 days.

(21) Appl. No.: 10/237,023

(22) Filed: Sep. 9, 2002

(65) Prior Publication Data
US 2003/0049505 A1    Mar. 13, 2003

(30) Foreign Application Priority Data
Sep. 10, 2001    (JP) .............................. 2001-272856

(51) Int. Cl.
*H01M 8/04*    (2006.01)
(52) U.S. Cl. ......................................... 429/25; 429/26
(58) Field of Classification Search .................. 429/13, 429/22, 25, 26
See application file for complete search history.

(56) References Cited

U.S. PATENT DOCUMENTS

| | | | |
|---|---|---|---|
| 4,838,020 A * | 6/1989 | Fujitsuka | 60/784 |
| 5,434,016 A | 7/1995 | Benz et al. | |
| 6,283,723 B1 | 9/2001 | Milburn et al. | |
| 6,312,843 B1 * | 11/2001 | Kimbara et al. | 429/25 |

FOREIGN PATENT DOCUMENTS

| | | |
|---|---|---|
| DE | 19701560 | 7/1998 |
| DE | 19944296 | 3/2000 |
| JP | A-2001-93553 | 8/1985 |
| JP | A-60-160573 | 4/2001 |

* cited by examiner

*Primary Examiner*—Jonathan Crepeau
(74) *Attorney, Agent, or Firm*—Antonelli, Terry, Stout and Kraus, LLP.

(57) ABSTRACT

A fuel cell stack has an air chamber to which is introduced compressed air that is produced by compressing the atmosphere with a compressor. Energy is recovered from exhaust discharged from the air chamber as it is expanded by an expander. The compressor and the expander are connected to each other via the air chamber of the fuel cell stack through piping. The pressure of the exhaust flowing through the piping is detected by a pressure sensor and, based on the detected pressure, a throttle valve controls a flow rate of the exhaust drawn into the expander.

5 Claims, 3 Drawing Sheets

FUEL CELL SYSTEM

BACKGROUND OF THE INVENTION

The present invention relates to a fuel cell system for generating electric power by hydrogen and oxygen, and more specifically to a fuel cell system having a compressed air feeder system for supplying air to a fuel cell.

A conventional example of a compressed air feeder system for a fuel cell is described in U.S. Pat. No. 5,434,016. The fuel cell system disclosed in this official gazette compresses air taken in from the atmosphere and supplies it to the fuel cell. Since exhaust from the fuel cell body has a higher pressure than that of the atmosphere, a power is recovered as the exhaust is released into the atmosphere and the recovered power is reused to compress the air taken in.

Another conventional example is disclosed in JP-A-2001-93553. In the fuel cell system described in this official gazette, one of scrolls in a scroll fluid machine that are formed on both sides of an end plate is used for compressing air and the other for collecting power of exhaust from the fuel cell. A volume ratio between a compressor and an expander is determined and an inner pressure of an air chamber of the fuel cell is set close to a predetermined value based on the volume ratio to have a high energy efficiency.

An appropriate value of an air pressure to be supplied to the air chamber of the fuel cell depends on the kind and specifications of the fuel cell. When only the power generation efficiency of the fuel cell body is considered, it is preferable to use a high air supply pressure because the higher the air supply pressure, the higher the partial pressure of oxygen in the air chamber will become and therefore the more the reaction will be accelerated. This allows the equipment to be reduced in size, resulting in an advantage of a reduced on-board weight when the fuel cell system is mounted on a vehicle. However, increasing the air supply pressure increases an energy required to compress the air. It also requires the fuel cell equipment to have enough pressure withstandability at elevated pressures. This will lead to an increased weight of the fuel cell equipment, which is detrimental to a vehicle-mounted fuel cell system. The optimum air pressure is determined taking into consideration these conflicting conditions as well as the characteristics of the fuel cell body itself. Not only does the fuel cell have an optimum air supply pressure but there is also an optimum value for air flow rate. That is, unless oxygen to be used for reaction is supplied in sufficient amount, the reaction is retarded. On the other hand, supplying air in excess volume increases the amount of wasted oxygen not used for the reaction.

By the way, the condition of use of the fuel cell is not the same at all times. The environmental conditions, such as atmospheric pressure, temperature and humidity, vary according to season and time band and the demands for the output electric power of the fuel cell is also changing every minute. Particularly in a car-mounted fuel cell, when the vehicle moves from a low-altitude area to a high-altitude area, when it enters or exits a tunnel, when it is running up or down a slope, or when a rapid acceleration is required, the service condition changes greatly. When these service conditions change, the inner pressure of the air chamber also changes. At this time the optimum values of the pressure and flow rate of the supplied air also change for the reasons described above. The conventional technologies described above do not refer at all to the changes in the service condition nor do they make any provision for implementing a compressed air feeder system that can cope with a significant change in the service condition of the vehicle-mounted fuel cell.

Further, JP-A-60-160573 describes a turbo-compressor system for fuel cells that controls a turbine air flow by detecting a pressure in a compressor chamber. This fuel cell system employs a turbo-compressor, and therefore it is not appropriate to use this system on a fuel cell powered vehicle that is subject to abrupt load variations. The technology described in this official gazette is intended for a stationary system and thus effects the control based on the pressure in the pressure chamber. As a result, the distance between a pressure detection point and a control valve is long, taking a long time before the control stabilizes.

SUMMARY OF THE INVENTION

An object of the present invention is to provide a fuel cell system capable of quickly supplying compressed air if environmental conditions and output demand change.

Another object of the invention is to provide a vehicle-mounted fuel cell system capable of improving the reliability.

Still another object of the invention is to realize a highly efficient vehicle-mounted fuel cell system.

The invention is intended to achieve at least one of the above objectives.

To achieve the above objectives, a first aspect of the invention resides in a fuel cell system comprising a fuel cell body with an air chamber; a displacement type compressor supplying compressed air to the air chamber, and an expander making expansion of exhaust discharged from the air chamber. The system further comprises piping connecting the compressor and the expander via the air chamber of the fuel cell body, and a pressure sensor detecting a pressure of air flowing through the piping, wherein at least a flow rate of the air from the compressor or a flow rate of the exhaust drawn into the expander is controlled according to the air pressure detected by the pressure sensor.

It is preferable that the pressure sensor is disposed between the air chamber of the fuel cell body and the expander, a variable-throttle control mechanism is provided downstream of the pressure sensor, and the variable-throttle control mechanism effects feedback-control on at least the flow rate of the air from the compressor or the flow rate of the exhaust drawn into the expander.

It is also preferable that the expander is of a displacement type, a power output shaft of the expander and a power input shaft of the compressor form a common shaft, a volume to be drawn in for every revolution of the shaft of at least the compressor or the expander is made variable, and the volume to be drawn in is changed according to the pressure detected by the pressure sensor.

A second aspect of the invention resides in a fuel cell system comprising, a displacement type compressor supplying compressed air to a fuel cell body having an air chamber, and an expander recovering energy of exhaust discharged from the fuel cell body. The system further comprises piping connecting the compressor and the expander via the air chamber, and a heat exchanger of a variable capacity provided in the piping extending from the air chamber to the expander.

A third aspect of the invention resides in a fuel cell system comprising a fuel cell body with an air chamber, a displacement type compressor supplying compressed air to the air chamber, and an expander making expansion of exhaust discharged from the air chamber. The system further comprises a speed change gear coupling a power input shaft of the compressor to a power output shaft of the expander, which reduces a speed ratio of the power input shaft of the compressor relative to the power output shaft of the expander when an inner pressure of the air chamber of the fuel cell body is high and increases the speed ratio when the inner pressure of the air chamber is low.

A fourth aspect of the invention resides in a fuel cell system comprising a fuel cell stack with an air chamber, a displacement type compressor supplying compressed air to the air chamber, an energy recovery device recovering energy from exhaust discharged from the air chamber, and a control device controlling a flow rate of the exhaust entering the energy recovery device. It is preferable that this control device increases the flow rate of the exhaust to the energy recovery device when the inner pressure of the air chamber is high, and reduces the flow rate of the exhaust when the inner pressure is low.

It is also preferable that the energy recovery device includes the compressor and an expander connected to a rotating shaft of the compressor.

It is also preferable that the control device includes a pressure detection device installed on piping, which leads the exhaust to the energy recovery device, and a control valve provided downstream of the pressure detection device to receive a detection signal from the pressure detection device.

It is more preferable that the control device includes a control valve arranged in piping, which leads the exhaust to the energy recovery device, a first heat exchanger installed downstream of the control valve to cool the exhaust and condense water from the exhaust, and a second heat exchanger exchanging heat between the exhaust heat-exchanged by the first heat exchanger and the exhaust that has bypassed the control valve.

The control device may include a speed change device installed between the compressor and the expander and a pressure detection device installed in piping, which leads the exhaust from the air chamber to the energy recovery device, wherein a speed change ratio of the speed change device is changed according to a pressure detected by the pressure detection device.

Other objects, features and advantages of the invention will become apparent from the following description of the embodiments of the invention taken in conjunction with the accompanying drawings.

DETAILED DESCRIPTION OF THE PREFERRED EMBODIMENTS

The embodiments of the invention will be now described with reference to the accompanying drawings.

Figure 1:
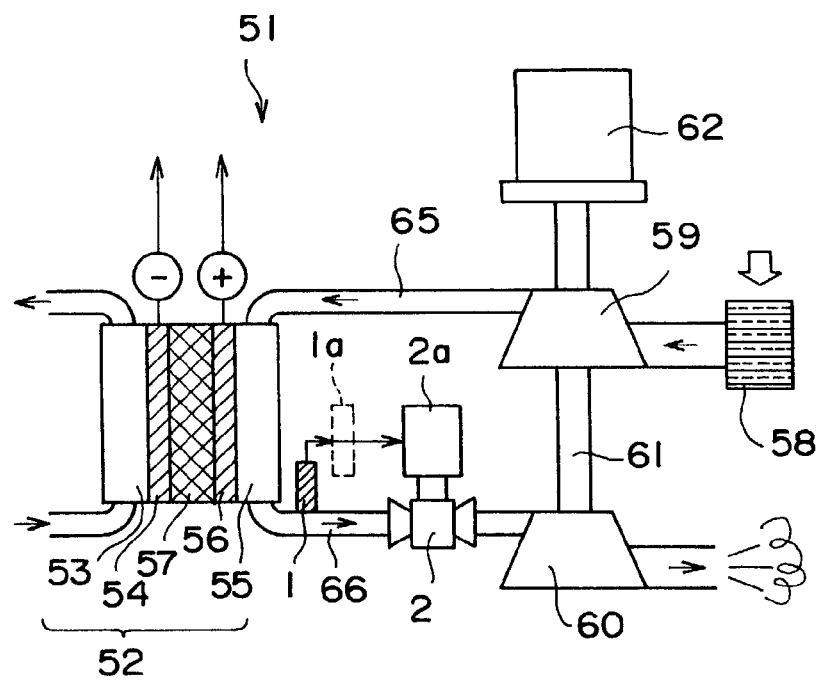
FIG. 1 is a system diagram of an embodiment of a fuel cell system according to the invention.

FIG. 1 is a system diagram of a fuel cell system 51 of the first embodiment. In a fuel cell body or fuel cell stack 52, a hydrogen electrode 54 that is in contact with a hydrogen chamber 53 for passage of hydrogen or a hydrogen-enriched gas, and an oxygen electrode 56 that is in contact with an air chamber 55 in which compressed air is supplied are arranged with a hydrogen ion permeable membrane 57 interposed therebetween.

Air drawn in from the atmosphere is removed of dust and particles by an air cleaner 58, then compressed to an elevated pressure by a displacement type compressor 59 and fed through an upstream pressure piping 65 to the air chamber 55. Oxygen in the air introduced into the air chamber 55 decreases in volume due to the reaction in the fuel cell stack 52, which produces water or water vapor from the oxygen and hydrogen used in the reaction.

A pressure loss or drop that occurs when the compressed air passes through the fuel cell stack 52 is not large. For example, even when the atmospheric pressure of 0.1 MPa is raised to 0.3 MPa by the compressor 59, the pressure loss caused by its passage is only about 0.02 MPa. Hence, the pressure of exhaust discharged from the air chamber 55 is about 0.28 MPa which, if recovered even partially, can improve the efficiency of the fuel cell. Thus, the exhaust of the air chamber is introduced into an expander 60 through a downstream pressure piping 66 to recover a power. Inner pressures of the piping 65, 66 leading from an exhaust port of the compressor 59 through the air chamber 55 to an intake port of the expander 60 are higher than the atmospheric pressure, so that these piping is constructed to be able to withstand these high pressures.

The recovered power is transmitted to the compressor 59 through a coupling shaft 61 that connects the expander 60 to the compressor 59. The recovered power is not enough to compress the air to be supplied to the fuel cell stack 52, and a motor 62 is provided the opposite side of the compressor 59 to the expander 60 to make up for the power required to compress the air to be supplied to the air chamber.

A state of air drawn into the fuel cell changes depending on the environmental conditions such as temperature, humidity and pressure of the atmosphere. Demands for electric power generated by the fuel cell also change according to the conditions required by a user. Therefore, an optimum inner pressure of the air chamber and an optimum supply air flow rate that meet these environmental conditions and user requirements also change. The air flow rate can be controlled relatively easily by changing a revolution speed of the compressor. However, the pressure of the compressed air is affected by flow rates of the compressed air flowing through the compressor and of the exhaust flowing through the expander, and also by the water generation reaction in the fuel cell stack and the condensation of generated water vapor. It has therefore been difficult to optimize pressures of various parts in the fuel cell system.

The invention aims at making pressures of various parts in the fuel cell system optimum to enhance its efficiency. The increased efficiency in turn enables the fuel cell system to be reduced in size and thus used optimumly for vehicle applications.

In FIG. 1 a pressure sensor (pressure detector) 1 is provided in the downstream pressure piping 66a, and an electric powered throttle valve 2 is provided in the same piping downstream of the pressure sensor 1. The pressure sensor 1 is fixed perpendicularly to a wall of the downstream pressure piping 66 so that it can avoid a dynamic pressure of the exhaust from the air chamber 55. A voltage signal proportional to the pressure detected by the pressure sensor 1 is output from the pressure sensor 1. An opening of the motor-driven throttle valve 2 is changed according to the output from the pressure sensor 1. The electric powered throttle valve 2 is provided with a motor 2a which electrically opens or closes the valve 2.

An operation of the embodiment described above will be now explained. When the fuel cell system is to be activated, the throttle valve 2 is closed to a minimum opening in its variable range. This minimum opening is not a fully closed state. When the compressor 59 is started, air is drawn in from the atmosphere. The air drawn in is pressurized by the compressor 59 and delivered into the upstream pressure piping 65. The compressed air passes through the air chamber 55 with a small pressure drop and is then discharged into the downstream pressure piping 66.

The pressure sensor 1 detects the pressure of the compressed air flowing into the downstream pressure piping 66. Immediately after the starting of the compressor 59, the opening of the throttle valve 2 is small and thus the pressure upstream of the throttle valve 2 gradually increases. When the pressure as detected by the pressure sensor 1 rises to a sufficient level, the motor 2a of the throttle valve 2 is operated to slowly open the throttle valve 2. As the throttle valve 2 continues to be opened, an air volume compressed by the compressor 59 and an air volume discharged from the expander 60 balance each other, stabilizing the pressure detected by the pressure sensor 1. During the system is running at the stabilized pressure, if there is any change in the atmospheric pressure, temperature or humidity, the pressure of the air chamber 55 can be controlled almost constant by simply opening or closing the throttle valve 2.

Although this embodiment has been described as directly applying the output of the pressure sensor 1 to the throttle valve 2, it may so constructed as to introduce the output of the pressure sensor 1 to a controller such as a microcomputer indicated by a dashed line 1a, which then controls the electric powered throttle valve 2. The use of the controller 1a allows for a nonlinear control and also makes it possible to use an electric energy produced by the fuel cell stack 52 as a control variable.

Now suppose that an upper-level system in control of the fuel cell issues instructions calling for the fuel cell stack 52 to increase the electric energy generation. Normally, the revolution speed of the compressor 59 is accelerated to increase the air flow rate but this takes time and cannot respond quickly to the demand. This method is not practical for a vehicle application. Hence, before increasing the revolution speed of the compressor, the throttle valve 2 is slightly closed to increase the inner pressure of the air chamber 55 and thereby increase a reaction speed of the fuel cell stack 52. After this, when the revolution speed of the compressor 59 rises, the opening of the throttle valve 2 is returned to the original level. This sequence of operation enables a quick response to a demand from the upper-level system.

With this embodiment, the distance along the flow path between the pressure detection point and the throttle valve to be controlled is short, and therefore a time delay from the pressure detection to the operation of the controlled object is reduced, improving the responsibility and at the same time making it unlikely for such unstable phenomena as hunting to occur. In the above embodiment, although the pressure sensor 1 is used to control the electric powered throttle valve 2, it is possible to use a branched tube instead of the pressure sensor 1 and to use a piston cylinder type throttle valve, which is driven by a pressure introduced from the branched tube, instead of the throttle valve 2. This arrangement can obviate the devices operating on electricity and thus avoid an undesired operation or a failure to operate due to electromagnetic noise or broken wire. Further, it is desired that the pressure sensor be arranged as close to the throttle valve as possible in a range that can secure a desired measurement precision. Arranging the pressure measuring position and the flow rate control section close to each other in this manner can ensure a quick response even when there is an abrupt load change, as may be experienced with a car-mounted fuel cell, and can also avoid unstable control states such as hunting.

Figure 2:
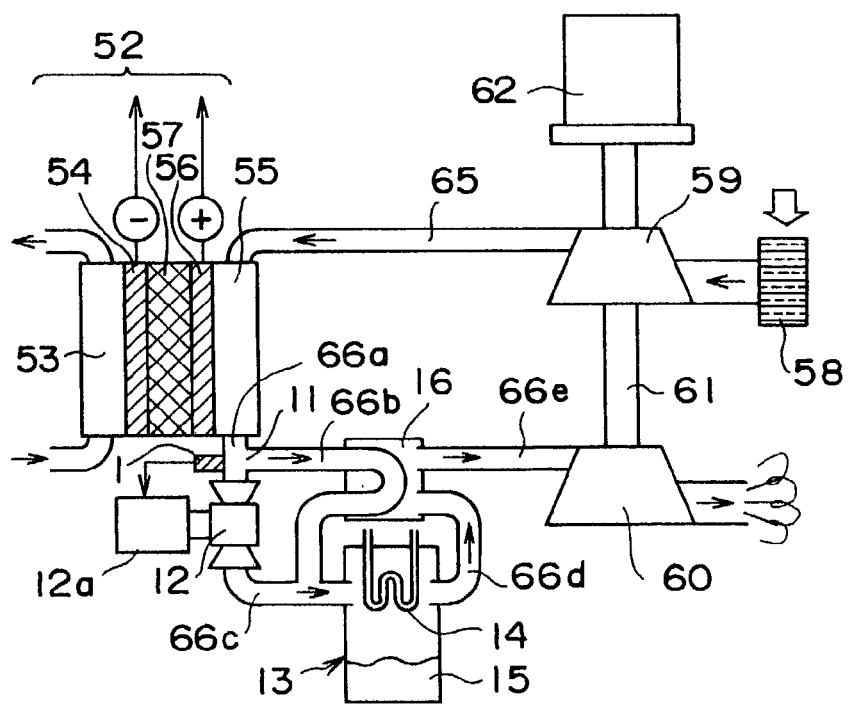
FIG. 2 is a system diagram showing another embodiment of a fuel cell system according to the invention.

Another embodiment of the present invention is shown in FIG. 2. This example differs from that shown in FIG. 1 in respect of flow rate control means provided at an outlet of the air chamber 55. That is, in this example, a branch portion 11 is provided in a downstream pressure piping 66a at the outlet of the air chamber 55. The downstream pressure piping 66a has a control valve 12 installed in one piping 66c and a heat exchanger 16 in the other piping 66b. These piping 66c and 66b are merged together on the outlet side of the control valve 12 and heat exchanger 16. Arranged downstream of the merging point is a water collector 13 constructed of a pressure vessel which has therein a heat exchanger (first heat exchanger) 14 that exchanges heat with coolant water. A lower part of the water collector 13 serves as a water reservoir for trapping condensed water 15. The exhaust coming out of the water collector 13 enters the heat exchanger (second heat exchanger) 16, where it is heat-exchanged with the exhaust that has bypassed the control valve 12, and then flows through piping 66e into the expander 60.

An operation of this embodiment will be explained. The control valve 12 is normally closed, and exhaust with a high water vapor content coming out of the air chamber 55 enters the water collector 13 through the heat exchanger 16. The exhaust is cooled as it passes through the heat exchanger 16. The exhaust cooled by the heat exchanger 16 is further cooled by cooling water in the heat exchanger 14 that is built in the water collector 13, condensing the water vapor contained therein. The condensed water 15 is collected at the bottom of the water collector 13. Then, the exhaust is heated as it passes through the heat exchanger 16 and is led into the expander 60.

Installed on the downstream pressure piping 66a is a pressure sensor 1 whose output is sent to the electric powered throttle valve 12 that is driven by a motor 12a. When the inner pressure of the downstream pressure piping 66a as detected by the pressure sensor 1 is too high, a pressure signal input to the electric powered throttle valve 2 causes the valve to start opening to limit a rate of exhaust flowing into the heat exchanger 16. At the same time, a flow rate of cooling water is increased to increase the cooling capacity of the heat exchanger 14 incorporated in the water collector 13.

The exhaust whose temperature is lowered sufficiently in the water collector 13 is heat-exchanged in the heat exchanger 16 with the exhaust that has bypassed the throttle valve 12. The volume of the exhaust that has bypassed the throttle valve 12 is reduced, and the amount of heat exchanged also decreases. Therefore, the exhaust is heated to a temperature that is lower than would normally be expected, and is then drawn into the expander 60. Since the temperature of the air drawn into the expander 60 is low, the air density is high and its volume reduced correspondingly. As a result, the mass of air introduced into the expander 60 per unit time increases. The volume of air discharged from the expander therefore increases, and a pressure increase in the pressure chamber is prevented, making it possible to control the inner pressure of the pressure chamber at a stabilized value.

With this embodiment, no throttling element with a large pressure loss is installed in the air path from the compressor to the expander, and the compressed air is subject to less air pressure drop, which in turn improves the energy efficiency. During a normal operation in particular, water is recovered from the exhaust in the water collector and the exhaust with a reduced water content is heated by the heat exchanger and then expanded in the expander, so that the power recovered by the expander can be increased.

Figure 3:
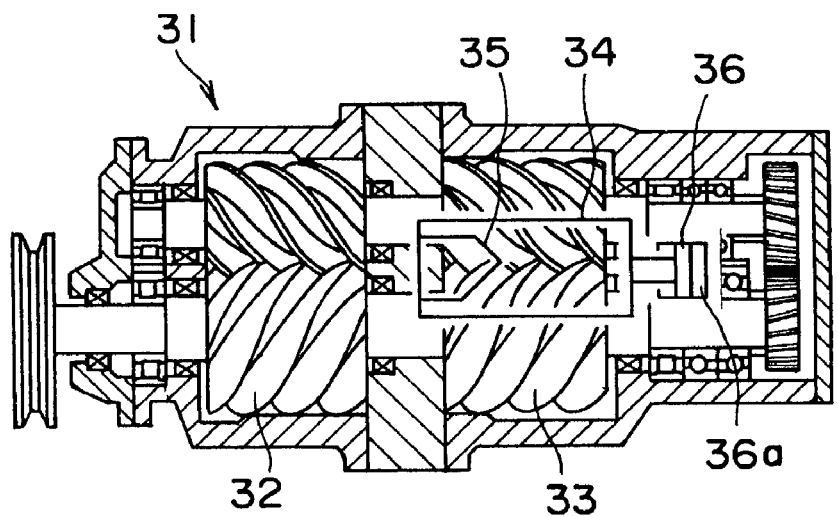
FIG. 3 is a sectional plane view showing an example of an air compressor/expander for a fuel cell used in the invention.
Figure 4:
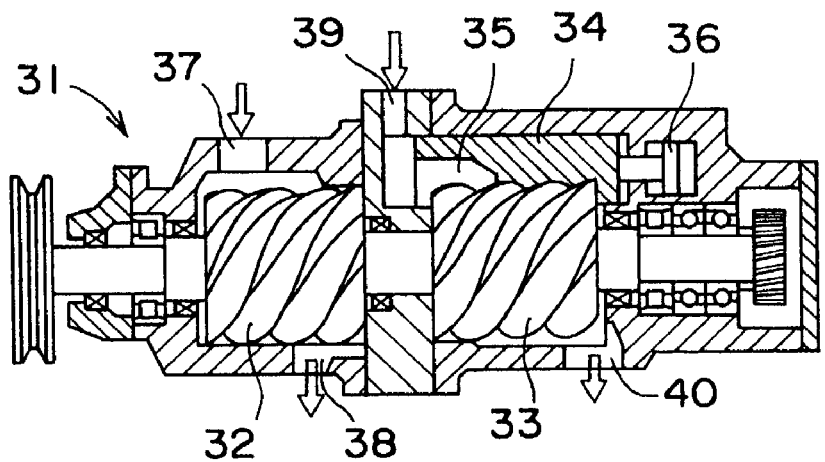
FIG. 4 is a vertical sectional view of the air compressor/expander of FIG. 3.

FIGS. 3 and 4 illustrate a specific example of the compressor and expander shown in FIGS. 1 and 2, in which FIG. 3 is a sectional plane view of the compressor and expander and FIG. 4 their vertical sectional view.

In this example, the compressor and the expander are formed in a one-piece structure as a compressor/expander 31, in which a screw type compressor 32 with a pair of male and female rotors and a screw type expander 33 with a pair of male and female rotors are coupled together at their shaft portions.

The compressor 32 has an inlet port 37 near a shaft end and an outlet port 38 near a central portion. The air sucked in from the inlet port 37 is compressed as the volume of a compression chamber decreases and is delivered from the outlet port 38.

The expander 33 has a slide valve 34 that can change a suction completion position. The slide valve 34 is formed with a suction port 35. The slide valve 34 is disposed above an engagement portion between the female and male rotors and is in contact with tooth tips of the female and male rotors. In FIG. 3 only simplified outlines of the slide valve 34 and the suction port 35 are shown. The slide valve 34 has a piston 36 at one end thereof, which is fitted in a cylinder 36a. A pressure difference between pressures acting on front and rear surfaces of the piston 36 causes the slide valve 34 to move in an axial direction (left or right in the figure). A suction port 39 of the expander communicates with the suction port 35. The expander 33 also has an outlet port 40 on a side opposite the suction port 39.

When it is judged that the inner pressure of the air chamber as detected by the pressure sensor 1 is not enough, the inner pressure of the cylinder 36a is controlled to move the piston 36 toward the left in the figure. This causes the slide valve 34 to move toward the left. As the slide valve 34 moves to the left, an area through which the suction port 35 formed in the slide valve 34 opens to the rotors decreases progressively.

An expansion chamber defined by the female and male rotors and a casing surrounding them has its volume at the end of the suction operation restricted by the outline of the suction port 35. That is, when the suction port 35 formed in the slide valve 34 moves toward the left, the volume of exhaust to be drawn in decreases. Reducing the amount of exhaust being drawn into the expander 33 by moving the slide valve 34 to the left causes the pressure in the air chamber 55 of the fuel cell stack to rise progressively. When the pressure in the air chamber comes close to an appropriate range, the slide valve 34 is returned to its original position and the compressor/expander 31 is operated to control the air chamber pressure within the appropriate range.

In this example, there is no throttle in the compressed air path extending from the compressor to the expander, a wasteful pressure drop does not occur, thus maintaining the energy efficiency at a high level. Further, because the compressor and the expander are integrated into a single device, the fuel cell stack can be reduced in size and a mechanical loss can be expected to decrease correspondingly.

Figure 5:
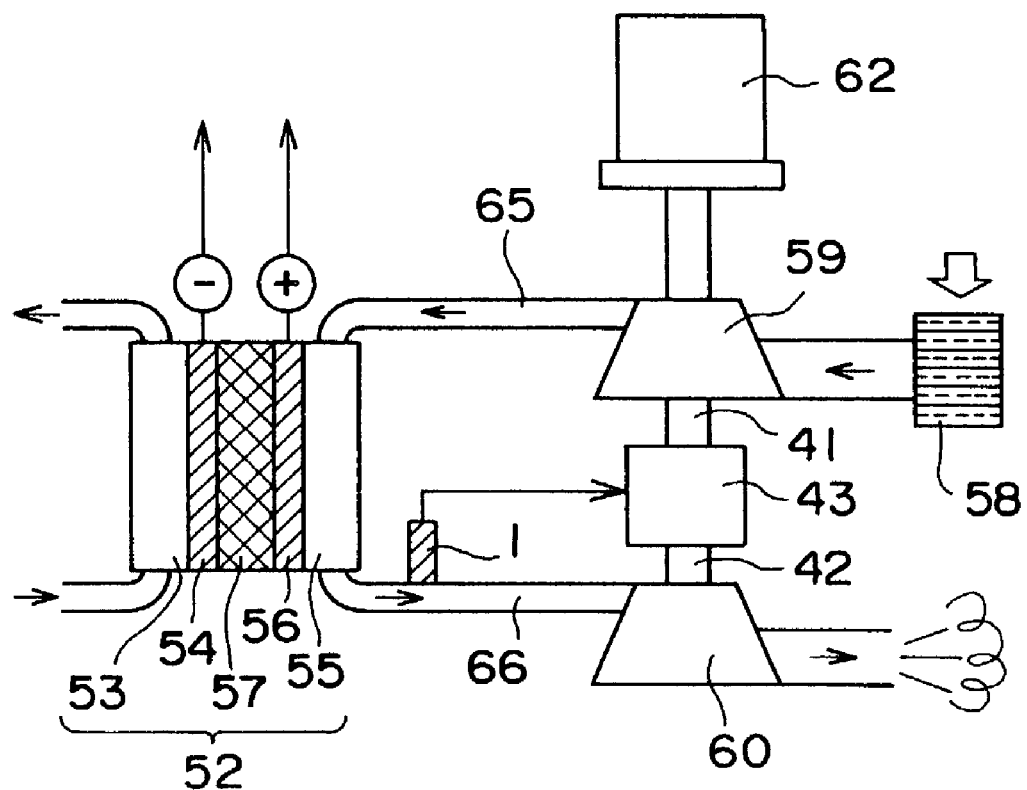
FIG. 5 is a system diagram showing still another embodiment of a fuel cell system according to the invention.

A still another embodiment of this invention is shown in FIG. 5. In this example, instead of providing the electric powered throttle valve 2 in the downstream pressure piping 66, a speed change transmission or gear is provided on a rotating shaft that connects the compressor and the expander. That is, the speed change gear 43 is installed between a power input shaft 41 of the compressor 59 and a power output shaft 42 of the expander 60. A reduction ratio of the speed change gear 43 between the input shaft 41 of the compressor 59 and the output shaft 42 of the expander 60 is continuously variable in a range of, for instance, between 1:2 and 2:1.

The inner pressure of the air chamber 55 in the fuel cell stack is selected so that the fuel cell stack has a highest efficiency when it is operating at the maximum output or the most frequently used output. Capacities of the compressor and the expander are chosen to realize this inner pressure. Suppose, for example, the reduction ratio of the speed change gear that realizes the high efficiency is 1:1. Then, running the system to keep the reduction ratio at almost 1:1 during the steady state operation can maintain the inner pressure of the air chamber in an optimum range. The reduction ratio of the speed change gear is changed according to the output of the pressure sensor 1 installed on the downstream pressure piping 66.

When the environmental conditions and the output requirements change and the inner pressure of the downstream pressure piping as detected by the pressure sensor 1 deviates from the optimum range to the higher side, the reduction ratio of the speed change gear 43 is shifted to 1:2 that increases the revolution speed of the expander. Since the revolution speed of the expander increases relative to the revolution speed of the compressor, the volume of the exhaust introduced from the pressure chamber into the expander increases more than the volume of the compressed air introduced from the compressor into the pressure chamber, thereby reducing the inner pressure of the pressure chamber. On the other hand, when the inner pressure of the downstream pressure piping as detected by the pressure sensor deviates from the optimum range to the lower side, the reduction ratio of the speed change gear 43 is shifted to 2:1 that increases the revolution speed of the compressor. This raises the inner pressure of the pressure chamber until it is controlled within the optimum range.

With this example, the pressure loss in the compressed air supply system for the fuel cell can be reduced, and a highly efficient fuel cell system can be realized. Further, the time taken to change the revolution speed of the compressor can also be reduced, realizing an excellent responsibility.

While this embodiment has been described as changing the reduction ratio of the speed change gear 43 according to the output of the pressure sensor 1, it is also possible to change the reduction ratio of the speed change gear 43 by employing, instead of the pressure sensor, a piston-cylinder mechanism that has a piston activated by exhaust flowing through a pipe branching from the downstream pressure piping 66.

The above-described embodiments should be regarded as illustrative rather than restrictive, and it should be appreciated that the present invention includes all possible variations that fall within the scope of appended claims.

According to this invention, even when the environmental conditions under which the fuel cell is operating or the output electric energy requirements change, the supply air can be quickly controlled to an appropriate pressure and an appropriate flow rate. As a result, the fuel cell system has an improved reliability and can operate the fuel cell with a high efficiency.

It will be further understood by those skilled in the art that the foregoing description has been made on the embodiments of the invention and that various changes and modifications may be made in the invention without departing from the spirit of the invention and the scope of the appended claims.

What is claimed is:

1. A fuel cell system comprising:
    a fuel cell body having an air chamber;
    a displacement type compressor supplying compressed air to the air chamber;
    an expander making expansion of exhaust discharged from the air chamber; and
    a speed change gear coupling a power input shaft of the compressor to a power output shaft of the expander, said speed change gear reducing a speed ratio of the power input shaft of the compressor to less than the power output shaft of the expander when an inner pressure of the air chamber of the fuel cell body is high and increasing the speed ratio when the inner pressure of the air chamber is low.

2. A fuel cell system comprising:
    a fuel cell stack having an air chamber;
    a compressor supplying compressed air to the air chamber;
    energy recovery means recovering energy from exhaust discharged from the air chamber; and
    control means controlling a flow rate of the exhaust entering the energy recovery means, wherein said control means includes a control valve arranged in piping leading the exhaust to the energy recovery means, a first heat exchanger installed downstream of the control valve to cool the exhaust and condense water from the exhaust, and a second heat exchanger exchanging heat between the exhaust heat-exchanged by the first heat exchanger and exhaust that has bypassed the control valve.

3. A fuel cell system according to claim 2, further comprising a motor for providing additional power for driving the compressor.

4. A fuel cell system according to claim 1, further comprising a motor for providing additional power for driving the compressor.

5. A fuel cell system, comprising:
    a fuel cell body having an air chamber;
    a displacement type compressor supplying compressed air to the air chamber;
    a displacement type expander making expansion of exhaust discharged from the air chamber, wherein a power output shaft of the expander and a power input shaft of the compressor form a common shaft and a volume to be drawn in for every revolution of the shaft of at least the compressor or the expander is variable;
    piping connecting the compressor and the expander via the air chamber of the fuel cell body;
    a pressure sensor installed between the air chamber of the fuel cell body and the expander for detecting a pressure of air flowing through the piping; and
    a control mechanism controlling at least a flow rate of the air from the compressor or a flow rate of the exhaust drawn into the expander according to the air pressure detected by the pressure sensor,
    wherein the piping is arranged so that all of the exhaust from the air chamber of the fuel cell body flows to the expander.

* * * * *